United States Patent Office 3,537,863
Patented Nov. 3, 1970

3,537,863
METHOD OF MAKING GARLIC BREAD
Niclos M. Sinnott, P.O. Box 400, Eureka, Calif. 95501
No Drawing. Filed June 16, 1967, Ser. No. 646,462
Int. Cl. A21d 2/36, 13/00; A23l 1/26
U.S. Cl. 99—90      2 Claims

ABSTRACT OF THE DISCLOSURE

A method of making garlic bread in which the garlic flavor is preserved during baking. Dehydrated garlic chips are blended into the bread dough at the time of kneading and are activated by vapor generated in the dough during baking.

---

Brief description of the background of the invention

The preservation of garlic flavor in baked bread has heretofore been impossible in the baking industry. The garlic, by whatever method added, has always baked out prior to the product being ready for consumption so that the flavor was lost. The addition of dehydrated garlic chips at about the time of kneading after all other ingredients are well mixed together and just prior to baking or at the prewarming or proofing stage, is one critical step for preserving the garlic flavor in the baked bread. Another critical factor is that dehydrated garlic chips in dry form must be used. It was found that fresh garlic, ground garlic, garlic juice or powder, or garlic salt, all lose flavor and fragrance in the baking process. Even dehydrated garlic chips fail if soaked prior to mixing into the dough. The theory of this action is that the dry, dehydrated garlic chips are activated by the moisture or steam created during the baking process so that activation is complete at the same time that the baking is completed, and the bread thus comes from the oven with full fresh garlic flavor, evenly distributed throughout the entire loaf; such bread can be sliced, toasted, buttered and served without any need for additional application of garlic.

The term garlic "chips" as herein used is to include dehydrated dry garlic flakes and dehydrated dry minced garlic, but does not include garlic powder or the like.

The herein method of making garlic bread includes the following steps:

(a) Provide one cup of sour dough starter. Usually such sour dough starter is made out of one cup of whole milk kept at room temperature about twenty-four hours, add one cup of flour, keep or put in open air covered with cheese cloth for about four hours; these ingredients are kept covered loosely for two to four days in a warm place until turned sour.

(b) Four cups of warm water are blended with one cup of sour dough starter.

(c) Three cups of flour are mixed well with the blended starter and water. The flour is so-called hard wheat flour, and may be winter wheat flour, rye, corn meal or whole wheat flour.

(d) The heretofore mixed ingredients are kept in a warm place, covered, for about twenty-four hours.

(e) Then about eight cups of hard wheat flour, of the type heretofore described are gradually added to the heretofore mixed ingredients, together with about two tablespoons (one-eighth of a cup) salt and two tablespoons of granulated sugar.

(f) Then dehydrated dry garlic chips are stirred and blended into the mass of the aforedescribed ingredients. The preferable amount of garlic chips is two tablespoons (one-eighth of a cup), namely about one-eighth of the volume of the starter.

(g) Then the blended mass is kneaded lightly and allowed to rest for about ten minutes.

(h) The kneaded dough is divided into parts according to loaf size. For instance, the example herein described is divided into four equal parts, and placed in suitable baking receptacles, such as small pie pans.

(i) The kneaded dough, so divided, is kept in a warm place at a temperature of about 140° F., such as a prewarming or proofing oven, for about forty minutes.

(j) The parts are then baked in a 400° F., oven for about forty minutes.

The product resulting from the above steps of the method is garlic bread which contains sour dough starter mixed with flour in proportion of eleven parts of flour to one part of starter by volume, and garlic chips or flakes, distributed throughout the bread, in proportion of about one-eighth part for each part of starter by volume.

I claim:
1. In a method of making garlic flavored bread.
the combination with the steps of providing a sourdough starter mixed in warm water and then with flour and then kneaded, formed into loaves and prewarmed and baked,
the step of mixing and blending dehydrated garlic chips into the mixed flour and starter at about the time of kneading and activating said dehydrated garlic chips by vapor generated in said mixture during baking.
2. The method specified in claim 1, and
said garlic chips being in the approximate proportion of one-eighth of the dough starter by volume.

References Cited

UNITED STATES PATENTS 2,406,431    8/1946    Miller _____ 99—204
3,424,593    1/1969    Bockman et al. ____ 99—140 XR

OTHER REFERENCES

Woman's Day Encyclopedia of Cookery, Fawcett Publications, Inc., New York, vol. 8, p. 1265 (1966), vol. 12, p. 1932 (1966).

ALVIN E. TANENHOLTZ, Primary Examiner

J. R. HOFFMAN, Assistant Examiner

U.S. Cl. X.R.
99—140.